United States Patent [19]

Vonusa et al.

[11] 4,274,092
[45] Jun. 16, 1981

[54] DISPLAY SYSTEM FOR MICROSCOPIC OPTICAL INSTRUMENTS

[75] Inventors: Richard S. Vonusa; Jeffrey P. Woodard, both of Rome, N.Y.

[73] Assignee: The United States of America as represented by the Secretary of the Air Force, Washington, D.C.

[21] Appl. No.: 91,991

[22] Filed: Nov. 7, 1979

[51] Int. Cl.³ .............................................. G06F 3/14
[52] U.S. Cl. .................................... 340/705; 340/706; 340/782
[58] Field of Search ............... 340/705, 706, 756, 762, 340/782; 354/23 D, 53, 54, 55, 60 E, 60 L

[56] References Cited

U.S. PATENT DOCUMENTS

| | | | |
|---|---|---|---|
| 3,289,176 | 11/1966 | Garth, Jr. et al. | 340/711 |
| 3,364,473 | 1/1968 | Reitz et al. | 340/711 |
| 3,382,487 | 5/1968 | Sharon et al. | 340/744 |
| 3,866,199 | 2/1975 | Eberhard et al. | 340/705 |
| 3,885,096 | 5/1975 | Inuiya | 340/705 |
| 4,028,712 | 6/1977 | Kawamura et al. | 340/756 |
| 4,075,619 | 2/1978 | Lapeyre | 340/706 |
| 4,149,795 | 4/1979 | Sakurada et al. | 340/706 |

Primary Examiner—Marshall M. Curtis
Attorney, Agent, or Firm—Donald J. Singer; Jacob N. Erlich

[57] ABSTRACT

A display system for use with a microscopic optical instrument having at least one eyepiece. The display system has a display unit operably attached to the eyepiece and incorporates therein a LED display which provides direct visual feedback to an individual who views imagery through the optical instrument. The LED display is interfaced to a computer which provides intelligent control of the display system when activated by the operator of the optical instrument. When not activated, the display system allows normal viewing through the optical instrument to take place.

8 Claims, 3 Drawing Figures

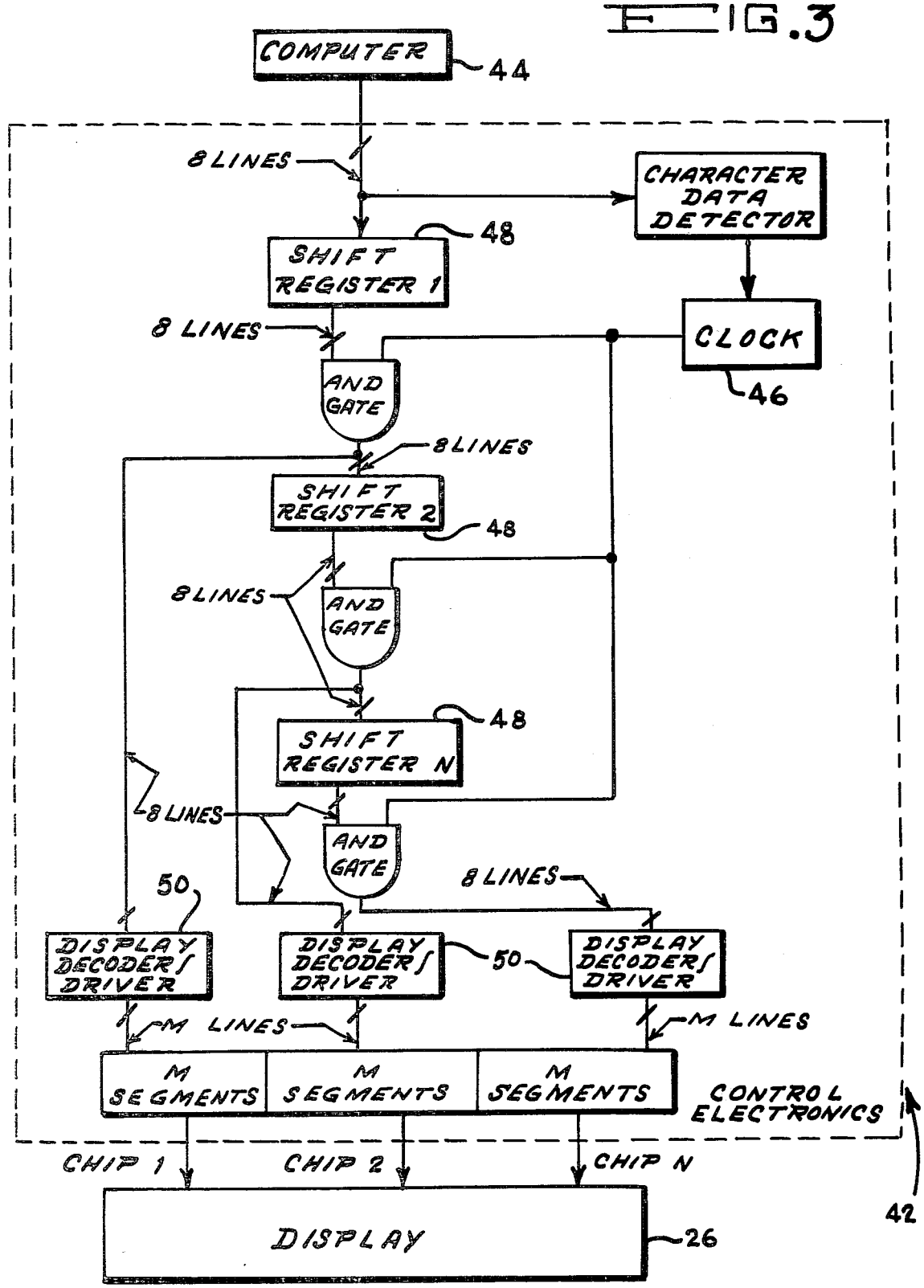

DISPLAY SYSTEM FOR MICROSCOPIC OPTICAL INSTRUMENTS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to microscopic optical instruments, and, more particularly, to a display system which is capable of being incorporated within a microscopic optical instrument.

Microscopic optical instruments are utilized in a variety of situations. For example, such instruments are becoming commonplace not only in the scientific laboratory, but also in association with medical examinations an operations, test equipment, and, particularly in the analysis of photographs, maps or the like.

A prime example of the use of such microscopic instruments is in the field of mapping wherein cartographers utilize stereoscopic optical instruments in order to analyze photographic imagery. The cartographers must derive and extract information from a photograph and enter the information into a computer. The computer analyzes this information in accordance with predetermined input conditions and outputs appropriate data based on this input. Presently cartographers must divert their attention away from the optical instruments utilized to manually code the computer input data on special coding sheets. The coding sheets are then entered into the computer. This process, however, of diverting the attention of the operator from the optical instrument and manually coding the data is both slow and prone to errors.

To overcome this problem, data entry has now taken the form of such entry forms as Automatic Speech Recognition (ASR) or tactile keyboards which allow the cartographer to keep his eyes focused on the photograph through the optical instrument as he enters the data directly into the computer. Unfortunately the above solution poses another problem to the operator of the optical instrument. In order to provide highly accurate data into the entry process, feedback directly into the optical eyepiece of the microscopic optical instrument is necessary to verify the spoken or typed data entry. Heretofore, such a combination which utilizes microscopic optical instruments in conjunction with a feedback system have been either unreliable in operation or extremely cumbersome and complex in design, thereby decreasing rather than increasing the efficiency of the cartographer or operator of the optical instrument.

SUMMARY OF THE INVENTION

The display system of this invention, which is capable of incorporation within microscopic optical instruments or the like, overcomes the problem encountered in the past and as set forth in detail hereinabove by reliably providing data feedback through the eyepiece of the optical instrument. This is accomplished by the utilization of an optical feedback display unit which incorporates therein a light emitting diode (LED) display. The LED display provides visual feedback to an individual who views the imagery by looking directly into the eyepiece of the optical viewing device.

The light emitting diode display is contained within a housing having appropriate optics therein and which permits direct attachment to the optical instrument. The remainder of the display system of this invention is made up of conventional control electronics which operably connects the display unit to a computer. The computer provides the intelligent control of the display system of this invention.

The light emitting diode utilized with the display unit of this invention is incorporated within a housing which is operably attached to one of the eyepieces of a microscopic optical instrument such as the Bausch and Lomb Zoom 240 Stereoscope. An opening is provided within one of the eyepieces in order to attach the housing thereto. Located within the housing and optically aligned with the LED display is a focusing mirror and its associated optical elements while a beam splitter is situated within the eyepiece of the optical instrument to receive and redirect the incoming output from the LED display. In addition a filter can be included in the other eyepiece of the instrument (that is, the eyepiece not having in the LED display associated therewith) so that the brightness level of the light into both eyepieces is substantially the same.

By viewing the light emitting diode directly in the eyepiece of the microscopic optical instrument, the display system of this invention can provide instantaneous visual feedback of data or commands entered by voice or keyboard into the computer. This information appears directly in the microscopic optical instrument and in the field of view of the operator when activated. When the system is not activated the feedback information does not interfere with the everyday operation of the optical instrument.

Operation of the display system of the present invention is initiated by the operator of the optical instrument: This is accomplished while the operator is looking through both eyepieces of the optical instrument. During usage the operator enters the appropriate data into the computer either by Automatic Speech Recognition or special tactile keyboard. The computer receives this data and transmits the information to the LED display from which it is displayed. The cartographer can use error correction command such as "ERASE" by ASR or a special erase key on a keyboard if he has incorrectly entered the data, or if the computer has misrecognized it. If no error has been made the operator may continue entering more data. Thus, the cartographer is able to continually keep his eyes focused on the imagery during the data entry process, increase the speed of utilization as well as the accuracy.

The control of the LED display is provided by conventional control electronics which is interconnected between the LED display and the computer. The beam splitter located within one of the eyepieces allows most of the light from the imagery to be viewed while the display is not visible when not activated by the control electronics.

It is therefore an object of this invention to provide an optical display system which is easily incorporated within microscopic optical instruments.

It is another object of this invention to provide an optical display system for microscopic optical instruments which allows simultaneous usage of the optical instrument as well as display of input and processed information.

It is still a further object of this invention to provide a display system for microscopic optical instruments which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 3 is a schematic illustration of one example of conventional control electronics which can be utilized with the display system of this invention.

DETAILED DESCRIPTION OF THE PREFERRED EMBODIMENT

Figure 1:
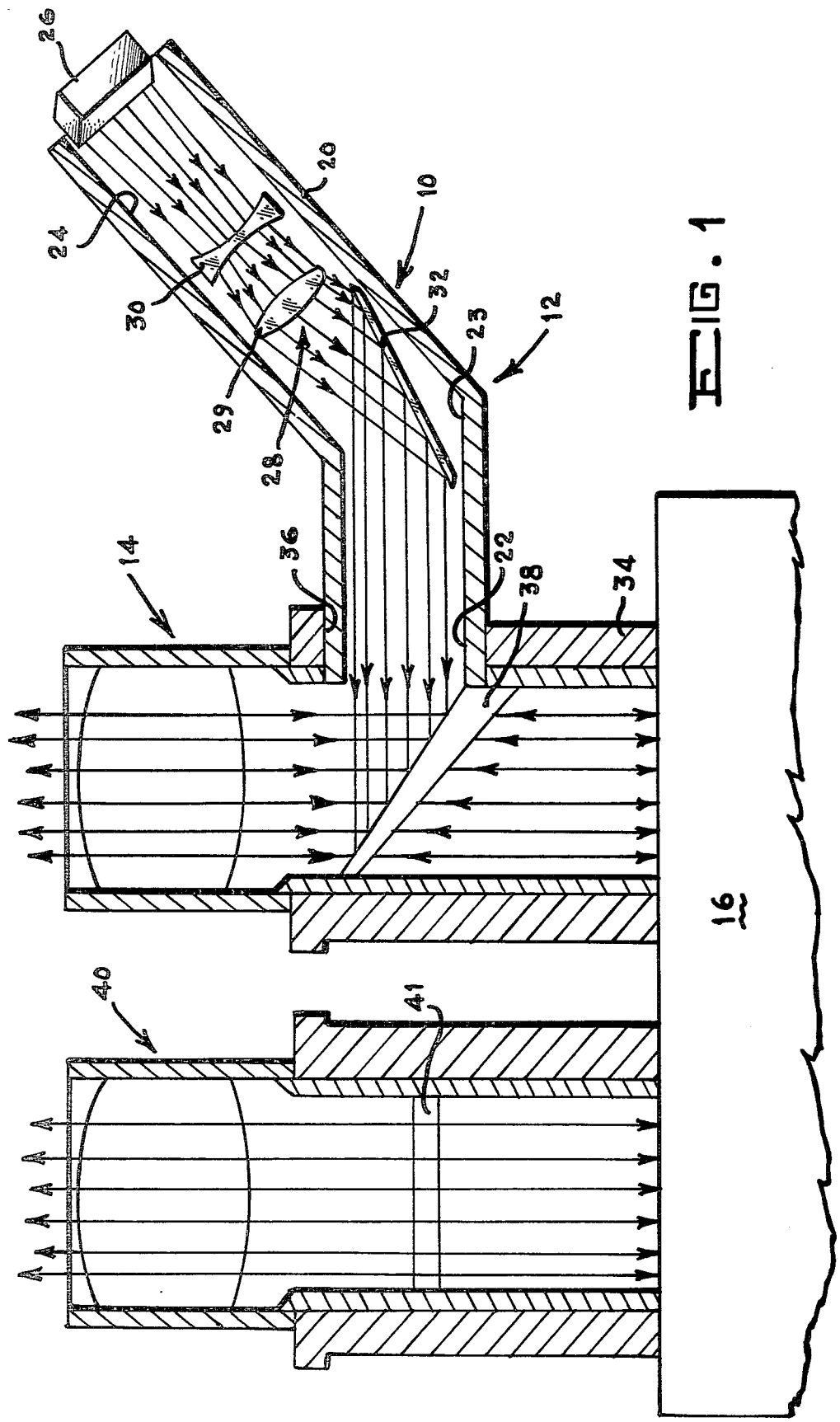
FIG. 1 is a cross-sectional view of the eyepieces of a conventional microscopic optical instrument having the display system of this invention incorporated thererin.

Reference is now made to FIG. 1 of the drawing which best illustrates the display unit 10 of the display system 12 of this invention utilized in operative relationship with one of the eyepieces 14 of a conventional microscopic optical instrument 16. One example of a microscopic optical instrument 16 which can be readily used with the instant invention is the Bausch and Lomb Zoom 240 Stereoscope which can be utilized to analyze photographic imagery.

Display unit 10 is made of a generally elongated tubular shaped housing 20 made of any suitable lightweight opaque rigid material such as aluminum or fiberglass. Housing 20 has one end 22 thereof secured to eyepiece 14 in a manner to be described in detail hereinbelow and the other end 24 thereof open to accommodate any suitable display means such as a conventional light emitting diode (LED) 26. Situated within housing 20 are the focusing optics 28 necessary to direct the output of display means 26 into the eyepiece 14 of microscopic optical instrument 16.

The focusing optics 28 may be made of a pair of conventional focusing lenses 29 and 30 in optical alignment with the output from display 26. If necessary a reflecting mirror 32 can be incorporated within housing 20 in order to redirect the output and properly align it with open end 22 of housing 20. This would be necessary in case there is a bend 23 within housing 20 as shown in FIG. 1 of the drawing.

In order to incorporate display unit 10 within eyepiece 14 of optical instrument 16, it is necessary to form within the side wall 34 of eyepiece 14 an aperture 36. The size of aperture 36 is such as to accommodate end 22 of display unit 10. Unit 10 can be secured within aperture 36 by any suitable securing method such as being press fit therein or it may be removably attached thereto. In case of removable attachment to eyepiece 14, a cover would be provided for aperture 36 in eyepiece 14 when the display unit 10 is not used. In addition to aperture 36, eyepiece 14 has a directing means incorporated therein in the form of, for example, a beam splitter 38. Beam splitter 38 is situated in optical alignment with the output of LED display 26. Consequently, the imagery viewed by the optical instrument 16 can be readily seen by the operator of the instrument even while viewing display 26. The other eyepiece 40 of optical instrument 16 may be fitted with a conventional filter 41 in order for the brightness level of the light into both eyepieces 40 and 14 to be approximately equal.

Figure 2:
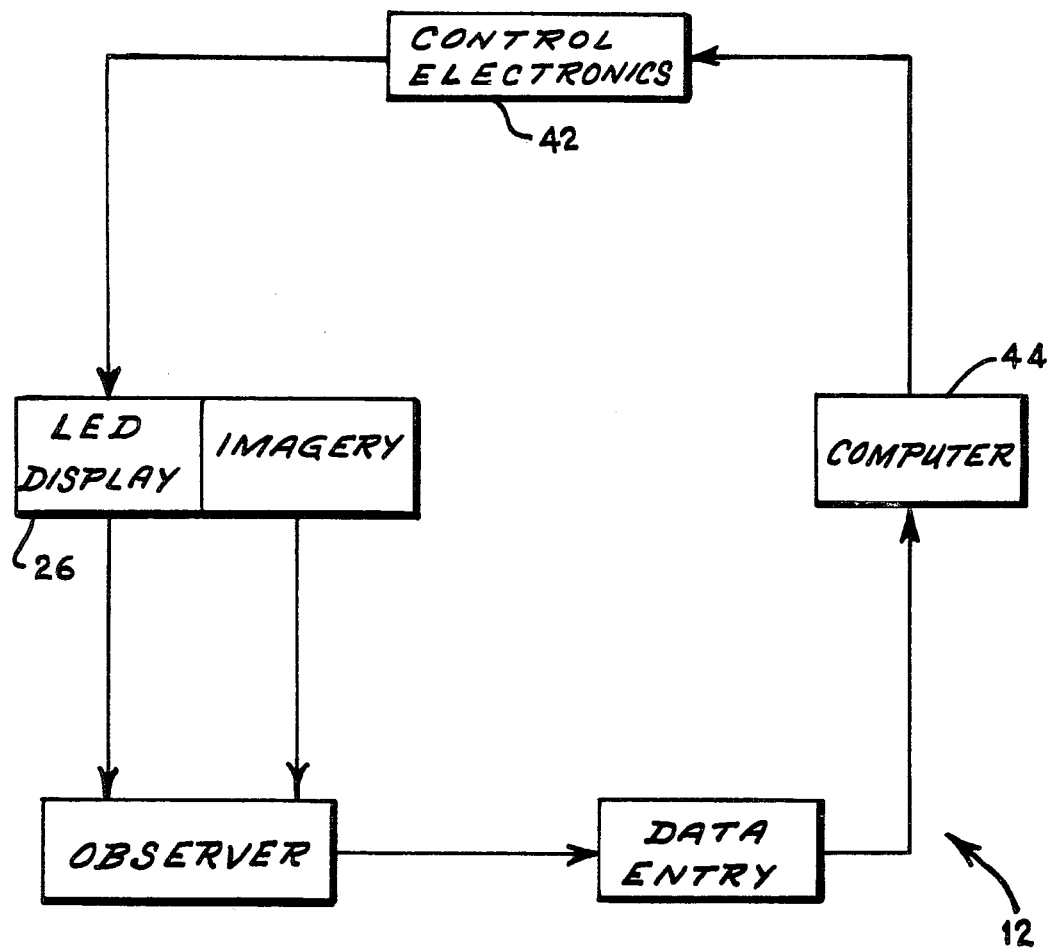
FIG. 2 is a schematic representation of a functional block diagram depicting the operation of the display system of this invention.

The entire display system 12 of this invention as clearly shown by the block diagram in FIG. 2 of the drawing is formed of not only of the display unit 10, but the appropriate conventional control electronics 42 for interconnection of display means 26 to a conventional computer 44. The computer 44 may be of the type such as the Data General Nova 800 Minicomputer.

An illustration of the conventional control electronics 42 is shown clearly in FIG. 3 of the drawing. With such an arrangement as shown in FIG. 3 of the drawing, the computer 44 outputs an 8 bit asynchronous, parallel data byte for each character to be displayed. This data is usually in the international ASC II Standard Code. The start of each output character stream is detected and controls a conventional internal clock 46. Clock 46 serves to shift each outputted character down a series of conventional shift-registers 48 until N characters have been clocked in. (It should be noted that "blanks" are a valid character). When the end of a character stream has occured, the final outputs of the shift registers are clocked out to conventional display decoder/drivers 50. The display decoder/drivers 50 convert the 8 input data lines into m lines of data; one line for each segment of display 26. The decoder/drivers 50 also provide proper output current and voltage levels to display 26.

Operation of the display system 10 of this invention takes place when the operator either by automatic speech recognition or by tactile keyboard feeds information to computer 44. During viewing through optical instrument 16, the operator may receive the feedback from computer 44 by way of display means 26. This is accomplished by the activation of the control electronics 42. In this way visual representation of the computer signal is seen through eyepiece 14. When not activated by control electronics 42, optical instrument 16 functions in its conventional manner with beamsplitter 38 permitting most of the light from the imagery to be viewed through the eyepieces 14 and 40 of microscopic optical instrument 16.

Although this invention has been described with reference to a particular embodiment, it will be understood to those skilled in the art that this invention is also capable of further and other embodiments within the spirit and scope of the appended claims.

We claim:

1. In an optical viewing instrument having at least one eyepiece incorporated therein and said eyepiece having a surrounding side wall and an opening at an end thereof for viewing imagery in optical alignment therewith, the improvement therein being in the form of a display system, said display system comprising an aperture located in said side wall of said eyepiece, a hollow housing having a pair of open ends, said housing being connected adjacent one of said open ends thereof to said side wall of said eyepiece and in optical alignment with said aperture, a display means operably connected to the other of said open ends of said housing for providing a beam of radiant energy containing information, focusing means located within said housing and in optical alignment with said beam of radiation containing information for directing said beam through said aperture in said eyepiece, directing means located within said eyepiece adjacent said aperture and in optical alignment with said beam of radiant energy for directing both said imagery and said beam through said opening in said eyepiece to an observer using said optical instrument, said information from said display means being superimposed over said imagery, whereby said observer can utilize said optical instrument for viewing both said imagery located in optical alignment with said optical instrument and said information from said display means.

2. In an optical viewing instrument as defined in claim 1 wherein said display means is in the form of a light emitting diode.

3. In an optical viewing instrument as defined in claim 2 wherein said directing means in said eyepiece is in the form of a beam splitter.

4. In an optical viewing instrument as defined in claim 3 wherein said directing means in said housing is in the form of at least one focusing lens.

5. In an optical viewing instrument as defined in claim 4 wherein said directing means further comprises a mirror.

6. In an optical viewing instrument as defined in claim 1 having a pair of eyepieces wherein said feedback display system further comprises a filter in the other of said eyepieces.

7. In an optical viewing instrument as defined in claim 1 wherein said information providing means is in the form of a computer and control electronics interconnecting said computer to said display means.

8. In an optical viewing instrument as defined in claim 3 wherein said housing is removably secured to said side wall of said eyepiece.

* * * * *